United States Patent
Tu et al.

(10) Patent No.: US 8,036,683 B2
(45) Date of Patent: Oct. 11, 2011

(54) COORDINATION AMONG MULTIPLE CO-LOCATED RADIO MODULES

(75) Inventors: Jerome Tu, Saratoga, CA (US);
Jianxiong Shi, Pleasanton, CA (US);
Olivier Boireau, Los Altos, CA (US);
Isabel Mahe, Los Altos, CA (US);
Alexander Fertelmeister, Cupertino, CA (US); Yury Fomin, Pleasanton, CA (US); Wen Zhao, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1002 days.

(21) Appl. No.: 11/555,255

(22) Filed: Oct. 31, 2006

(65) Prior Publication Data
US 2008/0102885 A1    May 1, 2008

(51) Int. Cl.
*H04W 24/00*    (2009.01)

(52) U.S. Cl. .................. 455/456.4; 455/553.1; 455/512; 455/63.1; 455/448; 455/450

(58) Field of Classification Search .................. 455/461, 455/63.1, 456.1, 448, 454, 450, 451, 452.1, 455/456.4, 553.1, 512
See application file for complete search history.

(56) References Cited

U.S. PATENT DOCUMENTS

| | | | |
|---|---|---|---|
| 5,499,243 A * | 3/1996 | Hall | ............................... 370/346 |
| 6,018,644 A | 1/2000 | Minarik | |
| 6,081,720 A * | 6/2000 | Sampson | ...................... 455/450 |
| 6,584,090 B1 | 6/2003 | Abdelgany et al. | |
| 6,643,522 B1 | 11/2003 | Young | |
| 6,704,346 B1 | 3/2004 | Mansfield | |
| 6,842,607 B2 | 1/2005 | Godfrey et al. | |
| 7,046,649 B2 | 5/2006 | Awater et al. | |
| 7,177,645 B2 * | 2/2007 | Goldhamer | ................... 455/447 |
| 7,233,602 B2 | 6/2007 | Chen et al. | |
| 7,251,459 B2 | 7/2007 | McFarland et al. | |
| 7,324,793 B2 | 1/2008 | Lee et al. | |
| 7,447,519 B2 | 11/2008 | Axness et al. | |
| 7,489,903 B2 * | 2/2009 | Johansson et al. | ......... 455/67.11 |
| 7,580,386 B2 * | 8/2009 | Oliver | ........................... 370/328 |
| 7,710,927 B2 | 5/2010 | Ozluturk | |
| 7,778,226 B2 * | 8/2010 | Rayzman et al. | ............. 370/337 |

(Continued)

FOREIGN PATENT DOCUMENTS

WO    2006059294    6/2006

(Continued)

OTHER PUBLICATIONS 802.15.2 (TM), "Part 15.2: Coexistence of Wireless Personal Area Networks with Other Wireless Devices Operating in Unlicensed Frequency Bands", IEEE Computer Society, New York, NY, Aug. 28, 2003.

(Continued)

*Primary Examiner* — Edward Urban
*Assistant Examiner* — Ganiyu Hanidu

(57) ABSTRACT

Techniques involving the coordination of wireless activities are disclosed. For example, an apparatus may include two or more transceivers. These transceivers may include a first transceiver to communicate wirelessly across cellular links, and a second transceiver to communicate wirelessly across wireless data networking links. The apparatus may also include controllers, each controlling wireless communications of a corresponding transceiver. Information may be exchanged with each other regarding operation of the transceivers. Through the exchange of such information, activity (e.g., transmission and reception of wireless signals) may be coordinated among the transceivers.

15 Claims, 7 Drawing Sheets

U.S. PATENT DOCUMENTS

| | | | |
|---|---|---|---|
| 2001/0005685 A1 | 6/2001 | Nishimori et al. | |
| 2002/0068588 A1* | 6/2002 | Yoshida et al. | 455/461 |
| 2002/0090974 A1 | 7/2002 | Hagn | |
| 2002/0136233 A1 | 9/2002 | Chen et al. | |
| 2004/0141522 A1* | 7/2004 | Texerman et al. | 370/466 |
| 2005/0170776 A1 | 8/2005 | Siorpaes et al. | |
| 2005/0226616 A1* | 10/2005 | Davidson | 398/79 |
| 2006/0104232 A1* | 5/2006 | Gidwani | 370/328 |
| 2006/0111042 A1 | 5/2006 | Pitchers | |
| 2006/0121916 A1 | 6/2006 | Aborn et al. | |
| 2006/0153284 A1 | 7/2006 | Souissi et al. | |
| 2007/0115905 A1* | 5/2007 | Jokela et al. | 370/338 |
| 2007/0129104 A1 | 6/2007 | Sano et al. | |
| 2007/0149123 A1* | 6/2007 | Palin | 455/41.2 |
| 2007/0238483 A1 | 10/2007 | Boireau et al. | |
| 2007/0293224 A1* | 12/2007 | Wang et al. | 455/436 |
| 2008/0253345 A1 | 10/2008 | Sanquinetti | |
| 2008/0260000 A1* | 10/2008 | Periyalwar et al. | 375/133 |

FOREIGN PATENT DOCUMENTS

| | | |
|---|---|---|
| WO | 2008055227 A2 | 5/2008 |

OTHER PUBLICATIONS

U.S. Appl. No. 11/617,277, filed Dec. 28, 2006, Jerome C. Tu.

Non-Final Office Action Mailed Apr. 2, 2010, U.S. Appl. No. 12/400,702, 16 pages.

International Search Report and Written Opinion, Mailed Sep. 30, 2010, Application No. PCT/US2010/026466.

* cited by examiner

US 8,036,683 B2

COORDINATION AMONG MULTIPLE CO-LOCATED RADIO MODULES

BACKGROUND

Mobile computing devices, such as smart phones, may provide various processing capabilities. For example, mobile devices may provide personal digital assistant (PDA) features, including word processing, spreadsheets, synchronization of information (e.g., e-mail) with a desktop computer, and so forth.

In addition, such devices may have wireless communications capabilities. More particularly, mobile devices may employ various communications technologies to provide features, such as mobile telephony, mobile e-mail access, web browsing, and content (e.g., video and radio) reception. Exemplary wireless communications technologies include cellular, satellite, and mobile data networking technologies.

Furthermore, devices may include multiple radios to handle different wireless technologies. For such a device, transmissions by one of its radios may interfere with the reception of wireless signals by another of its radios. As a result, signal degradation may occur. This degradation can impair or even prevent the device performing various communications applications.

DETAILED DESCRIPTION

Various embodiments may be generally directed to techniques for coordinating signal transmission and reception activities of multiple radios. These radios may be within a single device. Thus, such radios are also referred to as co-located radios.

For instance, embodiments may include an apparatus having two or more transceivers. These transceivers may include a first transceiver to communicate wirelessly across cellular links, and a second transceiver to communicate across wireless data networking links. The apparatus may also include controllers, each controlling wireless communications of a corresponding transceiver. Information may be exchanged with each other regarding operation of the transceivers.

Through the exchange of such information, activity (e.g., transmission and reception of wireless signals) may be coordinated among the transceivers. As a result, interference may be reduced. Thus, improvements may be attained in the quality of wireless signals received by the transceivers.

Embodiments of the present invention may involve a variety of wireless communications technologies. These technologies may include cellular and data networking systems. Exemplary data networking systems include wireless local area networks (WLANs), wireless metropolitan area networks (WMANs), and personal area networks (PANs).

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
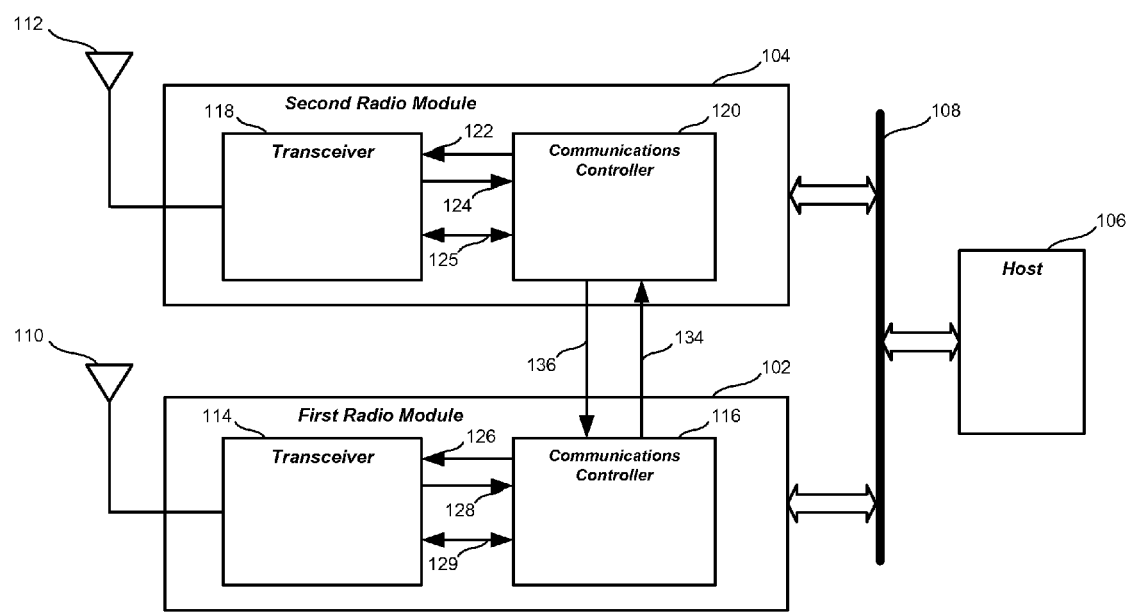
FIG. 1 illustrates one embodiment of an apparatus.

FIG. 1 illustrates one embodiment of an apparatus that may communicate across different types of wireless links. In particular, FIG. 1 shows an apparatus 100 comprising various elements. The embodiments, however, are not limited to these depicted elements. FIG. 1 shows that apparatus 100 may include a first radio module 102, a second radio module 104, a host 106, and an interconnection medium 108. These elements may be implemented in hardware, software, firmware, or in any combination thereof.

First radio module 102 and second radio module 104 may communicate with remote devices across different types of wireless links. For example, first radio module 102 may communicate across data networking links. Examples of such data networking links include wireless local area network (WLAN) links, such as IEEE 802.11 WiFi links. Further examples include wireless metropolitan area (WMAN) links, such as IEEE 802.16 WIMAX links, and personal area networks (PAN) links such as Bluetooth links. The embodiments, however, are not limited to these examples.

Second radio module 104 may communicate across wireless links provided by one or more cellular systems. Exemplary cellular systems include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Digital Advanced Mobile Phone Service (IS-136/TDMA), Narrowband Advanced Mobile Phone Service (NAMPS) systems, third generation (3G) systems such as Wide-band CDMA (WCDMA), CDMA-2000, Universal Mobile Telephone System (UMTS), cellular radiotelephone systems compliant with the Third-Generation Partnership Project (3GPP), and so forth. However, the embodiments are not limited to these examples. For instance, second radio module 104 may additionally or alternatively communicate across non-cellular communications links.

FIG. 1 shows that first radio module 102 includes a transceiver 114 and a communications controller 116. Transceiver 114 may transmit and receive wireless signals through an antenna 110. As described above, these signals may be associated with wireless data networks. However, the embodiments are not limited to such.

Communications controller 116 controls the operation of transceiver 114. For instance, communications controller 116 may schedule transmission and reception activity for transceiver 114. Such control and scheduling may be implemented through one or more control directives 126. Control directive(s) 126 may be based on operational status information 128, which communications controller 116 receives from transceiver 114. Also, such control directives may be based on status messages 136 received from radio module 104.

Further, communications controller 116 may perform operations on payload information 129 that it exchanges with transceiver 114. Examples of such operations include error correction encoding and decoding, packet encapsulation, various media access control protocol functions, and so forth.

As shown in FIG. 1, second radio module 104 includes a transceiver 118 and a communications controller 120. Transceiver 118 may transmit and/or receive wireless signals through an antenna 112. As described above, these signals may be associated with cellular communications networks. However, the embodiments are not limited to such.

Communications controller 120 controls the operation of transceiver 118. This may involve scheduling transmission and reception activity for transceiver 118. Such control and scheduling may be implemented through one or more control directives 122. Control directive(s) 122 may be based on operational status information 124, which communications controller 120 receives from transceiver 118. Also, such control directives may be based on status messages 134 received from radio module 102.

Additionally, communications controller 120 may perform operations on payload information 125 that it exchanges with transceiver 118. Examples of such operations include error correction encoding and decoding, packet encapsulation, various media access control protocol functions, and so forth.

In addition to performing the control operations described above, communications controllers 116 and 120 may provide coordination between radio modules 102 and 104. This coordination may involve the exchange of information. For instance, FIG. 1 shows that communications controller 116 may send status messages 134 to controller 120. Conversely, communications controller 120 may send status messages 136 to communications controller 116. These messages may be implemented as signals allocated to various signal lines. In such allocations, each message is a signal. However, further embodiments may alternatively employ data messages. Such data messages may be sent across various connections. Exemplary connections include parallel interfaces, serial interfaces, and bus interfaces.

Host 106 may exchange information with radio modules 102 and 104. As shown in FIG. 1, such exchanges may occur across interconnection medium 108. For instance, host 106 may send information to these radio modules for wireless transmission. Conversely, radio modules 102 and 104 may send information to host 106 that was received in wireless transmissions. In addition, host 106 may exchange information with radio modules 102 and 104 regarding their configuration and operation. Examples of such information include control directives sent from host 106 to radio modules 102 and 104.

Furthermore, host 106 may perform operations associated with higher layer protocols and applications. For instance, host 106 may provide various user applications, such as telephony, text messaging, e-mail, web browsing, word processing, video signal display, and so forth. In addition, host 106 may provide one or more functional utilities that are available to various protocols, operations, and/or applications. Examples of such utilities include operating systems, device drivers, user interface functionality, and so forth.

Interconnection medium 108 provides for couplings among elements, such as first radio module 102, second radio module 104, and host 106. Thus, interconnection medium 108 may include, for example, one or more bus interfaces. Exemplary interfaces include Universal Serial Bus (USB) interfaces, as well as various computer system bus interfaces. Additionally or alternatively, interconnection medium 108 may include one or more point-to-point connections (e.g., parallel interfaces, serial interfaces, etc.) between various element pairings.

In general operation, apparatus 100 may engage in communications across multiple wireless links. However, as described above, co-located radios may interfere with each other. More particularly, a first radio's transmissions may interfere with the reception of signals by a second co-located radio. Such interference degrades receiver performance in the second radio.

An example of such degradation may occur in a device having both WLAN (e.g., WiFi) capabilities and cellular telephony capabilities. For example, WiFi transmissions of a WiFi-enabled cellular phone may interfere with the phone's reception of cellular telephony signals. As a result, incoming signals may be unintelligible or of poor quality.

Embodiments, such as apparatus 100, may advantageously reduce or prevent such interference through the coordination of its wireless activities. For instance, transmissions by one radio module (e.g., radio module 102) may be prevented or discouraged during times of signal reception by another radio module (e.g., radio module 104). This coordination may be realized through the radio modules exchanging information. As described above, information exchange may be handled by communications controllers. However, the embodiments are not limited to such implementations.

The elements of FIG. 1 may be implemented in hardware, software, firmware, or in any combination thereof. For instance, features of communications controllers 116 and 120 may be implemented with instructions or logic (e.g., software) that is provided on a storage medium for execution by one or more processors. For such implementations, communications controllers 116 and 120 may each include a dedicated processor. Alternatively, such processor(s) may be shared among controllers 116 and 120 (as well as among other elements).

Figure 2:
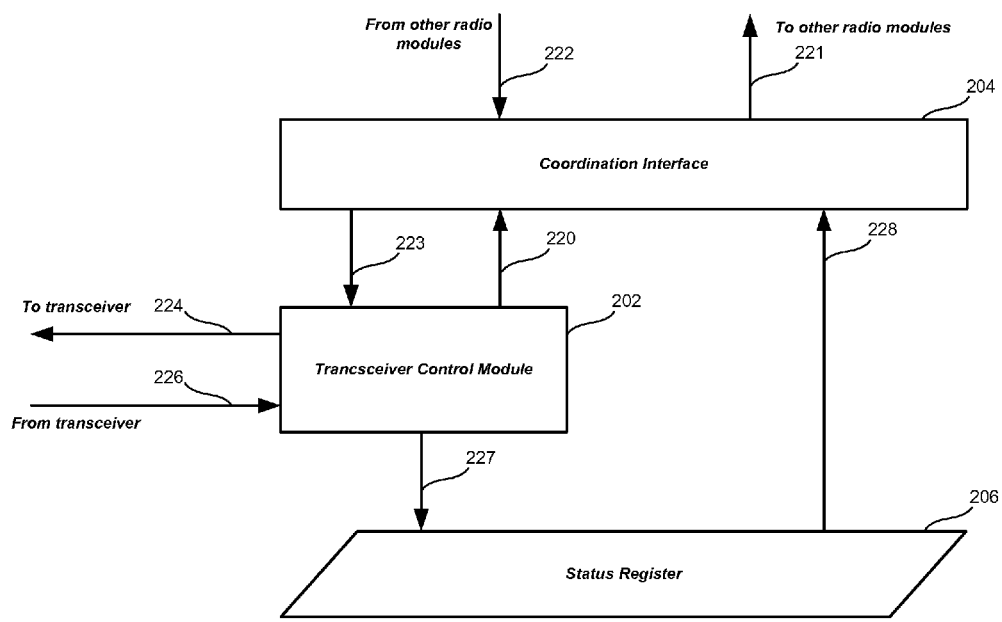
FIG. 2 illustrates an exemplary implementation embodiment that may be included within a communications controller.

As described above with reference to FIG. 1, radio modules 102 and 104 may each include a communications controller. FIG. 2 is a diagram of an exemplary implementation that may be included in these communications controllers. This implementation may comprise various elements. However, the embodiments are not limited to these elements. For instance, embodiments may include other combinations of elements, as well as other couplings between elements.

In particular, FIG. 2 shows implementation 200 having a transceiver control module 202, a coordination interface 204, and a status register 206. These elements may be implemented in hardware, software, firmware, or any combination thereof.

Transceiver control module 202 controls activities of a corresponding transceiver (such as transceiver 114 or transceiver 118). This may involve sending one or more directives to the corresponding transceiver. To provide such control, transceiver control module 202 may include various logic, routines, and/or circuitry that operate on information received from other radio modules. In embodiments, one or more processors may execute such logic and routines.

Such control may involve scheduling the corresponding transceiver's transmit and receive activities. This scheduling may involve determining when transmissions should be limited or prohibited. For instance, transceiver control module 202 may prohibit its corresponding transceiver from transmitting signals based on information received from other radios. An example of such information is an indication that another radio is currently receiving transmissions.

In embodiments, transceiver control module 202 may receive status data 226 from the corresponding transceiver.

Status data 226 may include various information. For instance, status data 226 may convey timing information. This may be in the form of clock or synchronization pulses. However, status data 226 may convey other information.

Coordination interface 204 handles the exchange of information with other radio modules. This exchange may involve providing one or more radio modules with operational information. For instance, coordination interface 204 may receive notifications 220 from transmission control module 202. These notifications convey information regarding the corresponding transceiver's activities or operational status. Based on such notifications, coordination interface 204 may send associated messages or signals 221 to other radios or radio modules.

In addition, coordination interface 204 may receive information 222 from other radio modules, as well as send corresponding notifications 223 to transceiver control module 202. In turn, transceiver control module 202 may send directives 224 to the corresponding transceiver for appropriate action (if any).

Moreover, coordination interface 204 may respond to information (i.e., requests) received from other radio modules. For example, other radio modules may request information regarding the corresponding radio's activity or operational status. Coordination interface 204 may obtain the requested information from transceiver control module 202 and/or status register 206. Thus, messages or signals 221 may convey such responsive information.

Coordination interface 204 may employ various techniques to exchange information with other radios or radio modules. For example, coordination interface 204 may activate and/or detect activated signal lines. Such signal lines may be dedicated to particular signals. Alternatively, coordination interface 204 may generate data messages to be transmitted across various connections. Exemplary connections may include a parallel interface, a serial interface, a bus interface, and/or a data network.

Status register 206 may store variables and information regarding the corresponding transceiver's activities and operational status. As shown in FIG. 2, transceiver control module 202 may store such information (indicated by arrow 227) in status register 206. Through this feature, information regarding a transceiver's operational status may be maintained. Thus, coordination interface 204 may access information (indicated by arrow 228). With this information, messages or signals 221 may be generated for reception by other radio modules. Status register 206 may comprise a storage medium, such as memory.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented, unless otherwise indicated. In addition, the given logic flow may be implemented by a hardware element, a software element executed by a processor, or any combination thereof. The embodiments are not limited in this context.

Figure 3:
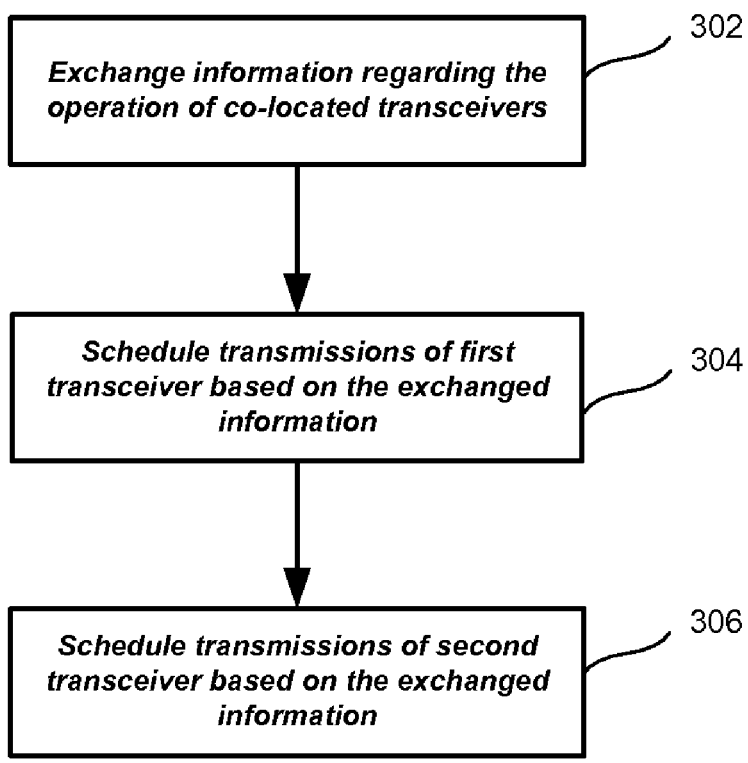
FIG. 3 illustrates one embodiment of a logic diagram.

FIG. 3 illustrates one embodiment of a logic flow. In particular, FIG. 3 illustrates a logic flow 300, which may be representative of the operations executed by one or more embodiments described herein. As shown in logic flow 300, a block 302 exchanges information regarding the operation of co-located first and second transceivers. In the context of FIG. 1, these may be transceivers 114 and 118. Thus, the first transceiver may engage in wireless communications across a cellular link and the second transceiver may communicate across wireless data networking link(s).

A block 304 schedules transmissions of the first transceiver based on the exchanged information to avoid reception of the transmissions by the second transceiver. Thus, with reference to FIG. 1, this scheduling may be performed by communications controller 116. However, the embodiments are not limited to this context.

A block 306 schedules transmissions of the second transceiver based on the exchanged information to avoid reception of the transmissions by the first transceiver. In the apparatus of FIG. 1, such scheduling may be performed by communications controller 120. However, the embodiments are not limited to this context.

Figure 4:
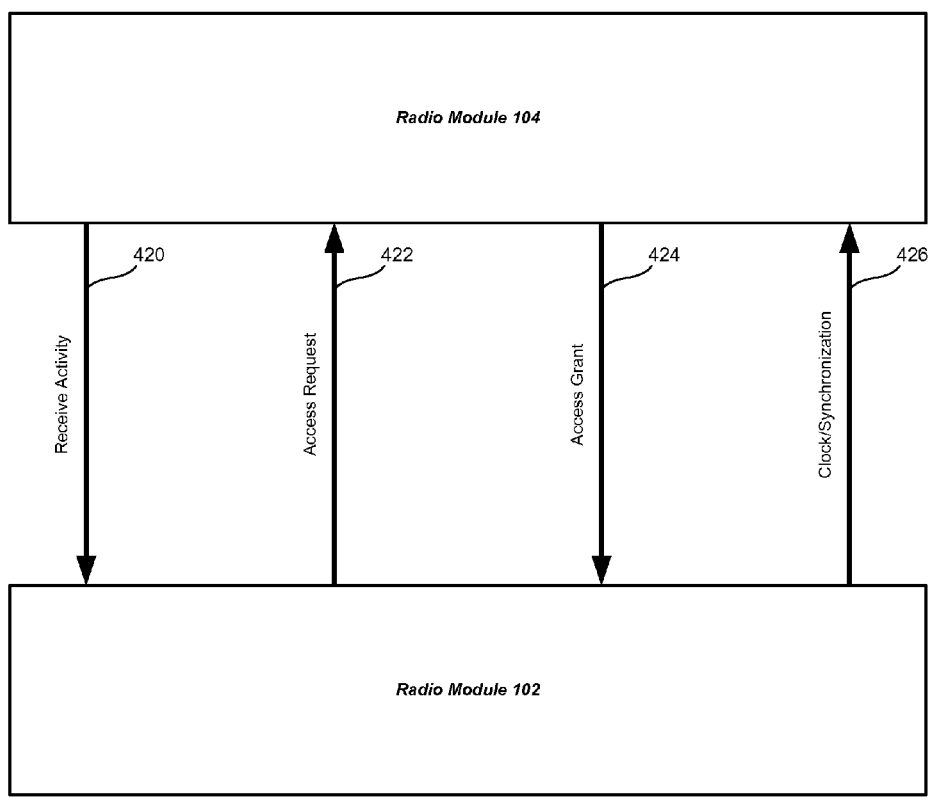
FIG. 4 is a diagram of an exemplary interaction between two radio modules.

As described above, radio modules may coordinate their activities through the exchange of information. This information may be in the form of various signals or messages. FIG. 4 provides an example of such coordination. In particular, FIG. 4 is a diagram illustrating an exemplary interaction between radio modules 102 and 104.

For purposes of illustration, this interaction involves radio module 104 having cellular capabilities and radio module 102 having WiFi capabilities. However, the present invention is not limited to such contexts. For instance, other wireless communications technologies may be employed. Also, interactions between more than two radios may occur.

FIG. 4 shows that (cellular) radio module 104 may generate a receive activity indicator 420, which is sent to (WiFi) radio module 102. This receive activity indicator specifies that radio module 102 is engaged in cellular reception activity. Such activity may include the existence of an active call as well as the reception of cellular paging packets during, for example, an idle mode. Upon receipt of signal 420, WiFi radio module 102 refrains from transmitting wireless signals.

WiFi radio module 102 generates an access request signal 422, requests permission for its transceiver to transmit wireless signals. In embodiments, signal 422 may indicate WiFi activity, such as signal transmission and/or signal reception. Alternatively or additionally, signal 422 may indicate WiFi priority. This priority may occur, for example, during WiFi transmission, idle mode probe, and so forth.

In response to signal 422, cellular radio 104 may generate an access grant signal 424. Thus, when active, this signal indicates that WiFi radio 404 may perform WiFi communications activities.

Further signals may be exchanged between radios 102 and 104. For instance, FIG. 4 shows clock (or synchronization) pulses 426. These pulses indicate the start and end times of transmit/receive frames. Such signals may be generated by one or both of radio modules 102 and 104.

The signals of FIG. 4 are provided as examples, and not as limitations. For instance, the roles of radio modules 102 and 104, as depicted in FIG. 4, may be reversed. In such a case, radio module 104 may generate access request 422 and radio module 102 may generate access grant 424.

Also, in addition to the signals of FIG. 4, further signals may be exchanged between such controllers. Moreover, such features may be provided by employing data messages (e.g., multiple bit words or packets) instead of dedicated signals. Moreover, such exchanges may occur between radios employing other wireless technologies.

Figure 5:
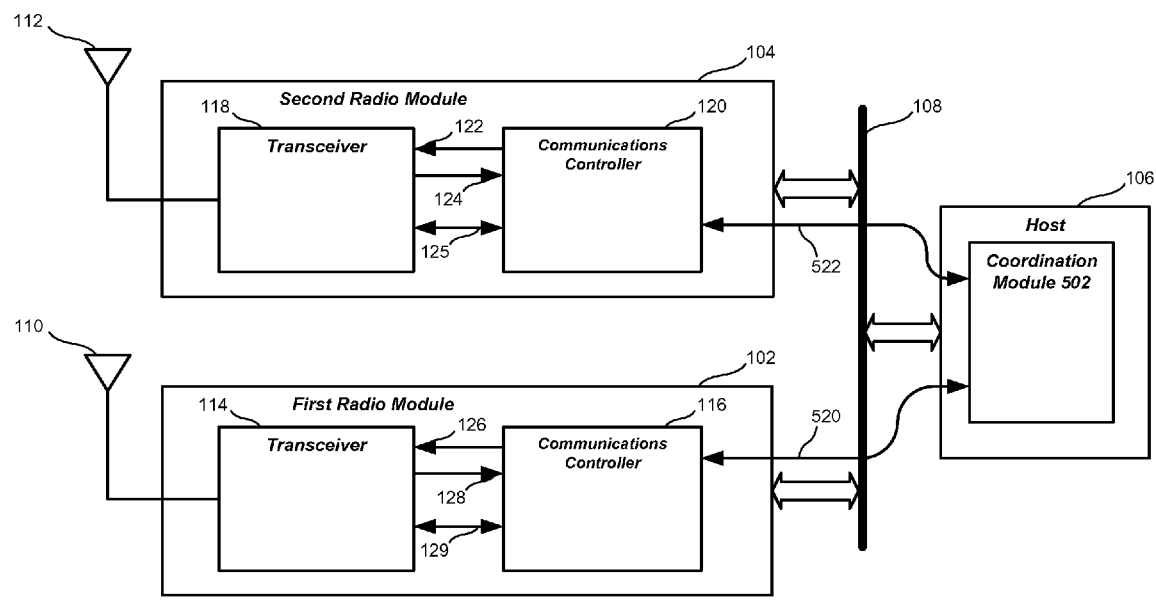
FIG. 5 illustrates a further embodiment of an apparatus.

FIG. 5 illustrates a further embodiment of an apparatus that may communicate across different types of wireless links. In particular, FIG. 5 is diagram of an apparatus 500 that is similar to apparatus 100 of FIG. 1. However, apparatus 500 includes a coordination module 502. As shown in FIG. 5, coordination module 502 may be included in host 106.

Coordination module 502 may control operations of transceivers 114 and 118. This may include scheduling transmission and reception activity for transceivers 114 and 118. Such control may be based on operational status of transceivers 114 and 118. Control and coordination of transceivers may involve the exchange of information between coordination module 502 and the communication controllers of each radio module. For instance, FIG. 5 shows coordination module 502 exchanging information 520 with communications controller 116 and information 522 with communications controller 120.

This information may include status data sent to coordination module 502. Such status data may originate as operational status information 124 and 128, which are provided by transceivers 114 and 118. Further, this information may include commands sent to communications controllers 116 and 120. In turn, these communications controllers may forward associated control directives 126 and 122 to transceivers 114 and 118, respectively.

Information 520 and 522 may be implemented as signals allocated to various signal lines, data messages, and so forth. This information may be sent across various interconnection medium 108 or alternative connections.

Figure 6:
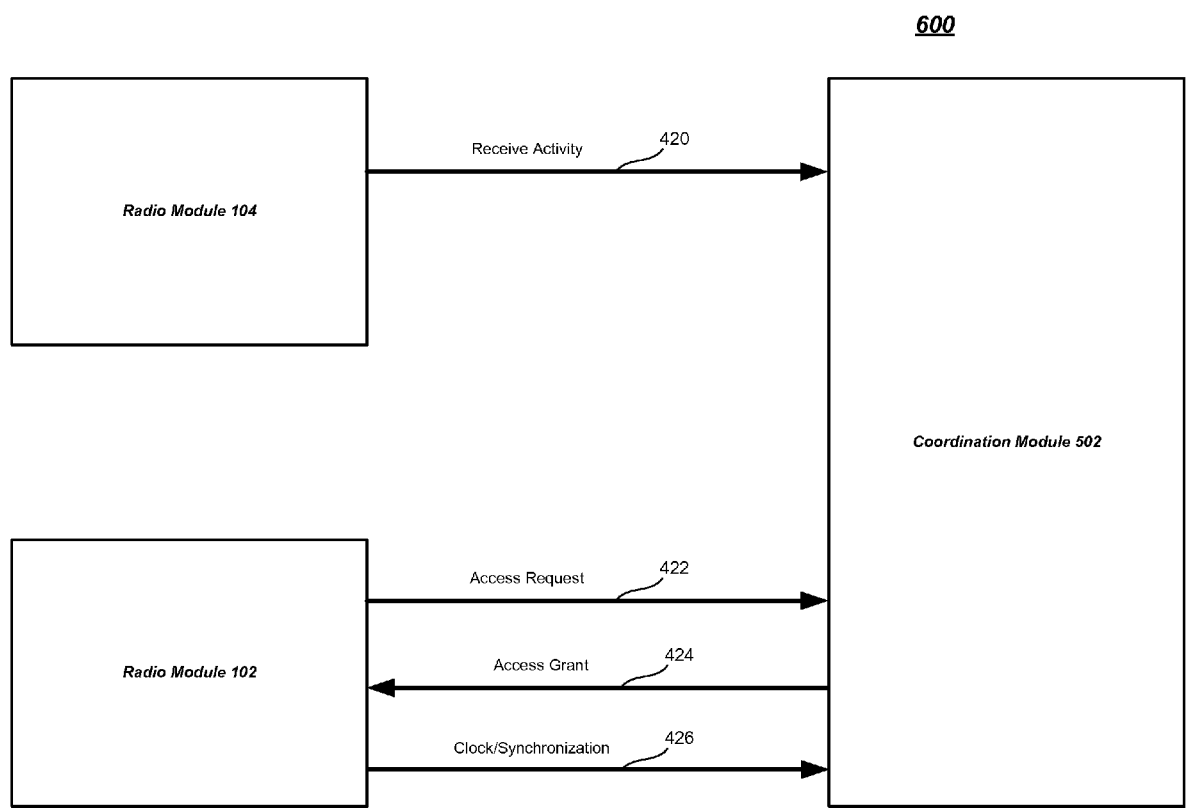
FIG. 6 is a diagram illustrating an exemplary coordination that may be performed by a coordination module.

FIG. 6 is a diagram 600 illustrating exemplary coordination that may be performed by coordination module 502. This coordination involves the messages of FIG. 4. However, these messages are not directly exchanged between radio modules 102 and 104. Instead, each of these modules communicates with coordination module 502. As shown in FIG. 6, radio module 102 may send receive activity signal 420 to coordination module 502. Upon receipt of this signal, coordination module 502 may prevent radio module 102 from transmitting wireless signals.

Radio module 102 generates an access request signal 422, which requests permission from coordination module 502 to transmit wireless signals. As described above with reference to FIG. 4, signal 422 may indicate WiFi activity, such as signal transmission and/or signal reception. Alternatively or additionally, signal 422 may indicate WiFi priority. This priority may occur, for example, during WiFi transmission, idle mode probe, and so forth.

In response to signal 422, coordination module 502 may generate an access grant signal 424 when radio module 104 indicates that its receive activities are completed. This may occur through a termination of signal 420 or through a separate signal (not shown). Thus, when active, signal 424 indicates that radio module 102 may perform WiFi communications activities.

As described above, further signals may be exchanged. For instance, FIG. 6 shows clock (or synchronization) pulses 426 being sent from radio module 102 to coordination module 502.

The signals of FIG. 6 are provided as examples, and not as limitations. For instance, the roles of radio modules 102 and 104, as depicted in FIG. 6, may be reversed. Also, further signals may be exchanged. Moreover, such features may be provided by employing data messages (e.g., multiple bit words or packets) instead of dedicated signals. Moreover, such exchanges may occur between radios employing other wireless technologies.

Figure 7:
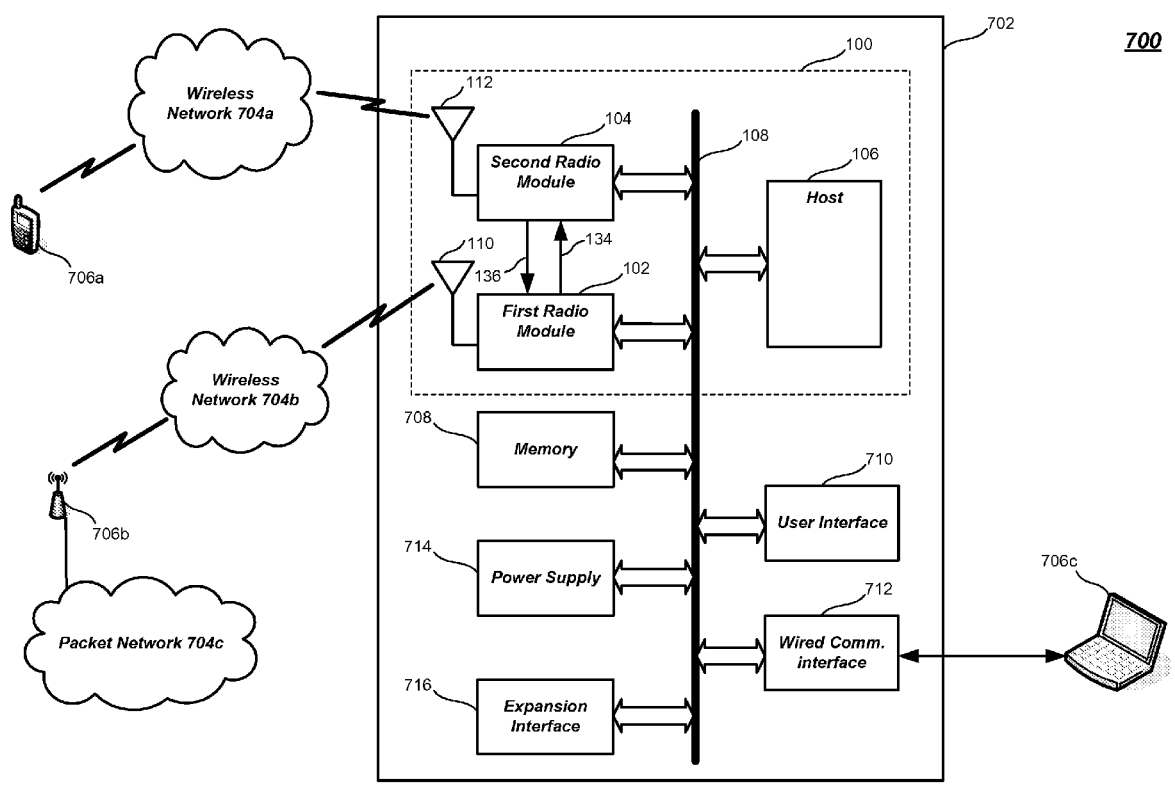
FIG. 7 illustrates one embodiment of a system.

FIG. 7 illustrates an embodiment of a system 700. This system may be suitable for use with one or more embodiments described herein, such as apparatus 100, implementation 200, logic flow 300, and so forth. Accordingly, system 700 may engage in wireless communications across various link types, such as the ones described herein. In addition, system 700 may perform various user applications.

As shown in FIG. 7, system 700 may include a device 702, multiple communications networks 704, and one or more remote devices 706. FIG. 7 shows that device 702 may include the elements of FIG. 1. However, device 702 may alternatively include the elements of FIG. 5. In addition, device 702 may include a memory 708, a user interface 710, a wired communications interface 712, a power supply 714, and an expansion interface 716.

Memory 708 may store information in the form of data. For instance, memory 708 may contain application documents, e-mails, sound files, and/or images in either encoded or unencoded formats. Alternatively or additionally, memory 708 may store control logic, instructions, and/or software components. These software components include instructions that can be executed by one or more processors. Such instructions may provide functionality of one or more elements in system 700. Exemplary elements include host 106, one or more components within radio modules 102 and 104, user interface 710, and/or communications interface 712.

Memory 708 may be implemented using any machine-readable or computer-readable media capable of storing data, including both volatile and non-volatile memory. For example, memory 708 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 708 may be included in other elements of system 700. For instance, some or all of memory 708 may be included on a same integrated circuit or chip with elements of apparatus 100. Alternatively some portion or all of memory 708 may be disposed on an integrated circuit or other medium, for example a hard disk drive, which is external. The embodiments are not limited in this context.

User interface 710 facilitates user interaction with device 702. This interaction may involve the input of information from a user and/or the output of information to a user. Accordingly, user interface 710 may include one or more devices, such as a keyboard (e.g., a full QWERTY keyboard), a keypad, a touch screen, a microphone, and/or an audio speaker. In addition, user interface 710 may include a display to output information and/or render images/video processed by device 702. Exemplary displays include liquid crystal displays (LCDs), plasma displays, and video displays.

Wired communications interface 712 provides for the exchange of information with a device 706c (e.g., a proximate device), such as a personal computer. This exchange of information may be across one or more wired connections. Examples of such connections include USB interfaces, parallel interfaces, and/or serial interfaces. In addition, interface 712 may provide for such exchanges across wireless connections(s). An infrared interface is an example of such a connection. The information exchanged with such proximate devices, may include e-mail, calendar entries, contact information, as well as other information associated with personal information management applications. In addition, such information may include various application files, and content (e.g., audio, image, and/or video).

Wired communications interface 712 may include various components, such as a transceiver and control logic to perform operations according to one or more communications protocols. In addition, communications interface 712 may include input/output (I/O) adapters, physical connectors to connect the I/O adapter with a corresponding communications medium.

FIG. 7 shows that device 702 may communicate across wireless networks 704a and 704b. In particular, FIG. 7 shows communications across network 704a being handled by second radio module 104, and communications across network 704b being handled by first radio module 102. Accordingly, first wireless network 704a may be a cellular network, while second wireless network 704b may be a wireless data network. However, the embodiments are not limited to these examples.

Such wireless communications allow device 702 to communicate with various remote devices. For instance, FIG. 7 shows device 702 engaging in wireless communications (e.g., telephony or messaging) with a mobile device 706a. In addition, FIG. 7 shows device engaging in wireless communications (e.g., WLAN, WMAN, and/or PAN communications) with an access point 706b. In turn access point 706b may provide device 702 with access to further communications resources. For example, FIG. 7 shows access point 706b providing access to a packet network 704c, such as the Internet.

Power supply 714 provides operational power to elements of device 702. Accordingly, power supply 714 may include an interface to an external power source, such as an alternating current (AC) source. Additionally or alternatively, power supply 714 may include a battery. Such a battery may be removable and/or rechargeable. However, the embodiments are not limited to these examples.

Expansion interface 716 may be in the form of an expansion slot, such as a secure digital (SD) slot. Accordingly, expansion interface 716 may accept memory, external radios (e.g., global positioning system (GPS), Bluetooth, WiFi radios, etc.), content, hard drives, and so forth. The embodiments, however, are not limited to SD slots. Other expansion interface or slot technology may include memory stick, compact flash (CF), as well as others.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
   a first transceiver to communicate wirelessly across cellular links;

a second transceiver to communicate wirelessly across wireless data networking links;

first and second controllers to exchange information via a coordination module regarding operation of the first and second transceivers, and to control wireless communications of the first and second transceivers based on the exchanged information, the exchanged information including a receive activity indicator sent from the first transceiver to the second transceiver, the receive activity indicator indicating that the first transceiver is engaged in an active cellular call, the exchanged information further including an access request sent from the second controller to the first controller, and an access grant sent from the first controller to the second controller, the access grant indicating the second transceiver may engage in wireless communications, and wherein the first controller schedules transmissions of the first transceiver to avoid reception of the transmissions by the second transceiver, the scheduling including preventing all transmissions by the first transceiver during periods of signal reception by the second transceiver.

2. The apparatus of claim 1, wherein the second controller schedules transmissions of the second transceiver to avoid reception of the transmissions by the first transceiver.

3. The apparatus of claim 1, wherein the information exchanged between the first and second controllers includes:
an access request sent from the first controller to the second controller;
an access grant sent from the second controller to the first controller, the access grant indicating the first transceiver may engage in wireless communications.

4. The apparatus of claim 1, wherein the first and second controllers each include a storage medium to store operational information regarding the corresponding transceiver.

5. A method, comprising:
exchanging information regarding operation of co-located first and second transceivers via a coordination module using a first and second controller, the first transceiver to communicate wirelessly across a cellular link and the second transceiver to communicate wirelessly across a wireless data networking link, the exchanged information including a receive activity indicator sent from the first transceiver to the second transceiver, the receive activity indicator indicating that the first transceiver is engaged in an active cellular call, the exchanged information further including an access request sent from the second controller to the first controller, and an access grant sent from the first controller to the second controller, the access grant indicating the second transceiver may engage in wireless communications;
scheduling transmissions of the first transceiver based on the exchanged information to avoid reception of the transmissions by the second transceiver, the scheduling including preventing all transmissions by the first transceiver during periods of signal reception by the second transceiver; and
scheduling transmissions of the second transceiver based on the exchanged information to avoid reception of the transmissions by the first transceiver.

6. The method of claim 5, wherein exchanging information regarding operation of the co-located first and second transceivers comprises:
sending an access request from the first controller to the second controller;
sending an access grant from the second controller to the first controller, the access grant indicating the first transceiver may engage in wireless communications.

7. A radio, comprising:
a transceiver to communicate across a wireless link, the wireless link including a cellular link or a wireless data networking link;
a controller to control and to coordinate activity of the transceiver with activity of at least one other co-located radio; and
an interface to exchange information with the at least one other co-located radio via a coordination module, the exchanged information including a receive activity indicator sent from the transceiver to the at least one other co-located radio, the receive activity indicator indicating that the transceiver is engaged in an active cellular call, the exchanged information further including an access request sent to the controller, and an access grant sent from the controller to the at least one other co-located radio, the access grant indicating the at least one other co-located radio may engage in wireless communications;
wherein the controller schedules transmissions of the transceiver to avoid reception of the transmissions by the at least one other co-located radio, said scheduling including preventing all transmissions by the transceiver during periods of signal reception by the at least one other co-located radio.

8. The radio of claim 7, further comprising a storage medium to store operational information regarding the transceiver.

9. An article comprising a computer-readable storage medium containing instructions that, when executed, enable a system to:
coordinate activity of a transceiver with activity of at least one other co-located radio;
exchange information with the at least one other co-located radio via a coordination module, the exchanged information including a receive activity indicator sent from the transceiver to the at least one other co-located radio, the receive activity indicator indicating that the transceiver is engaged in an active cellular call, the exchanged information further including an access request sent to a controller, and an access grant sent from the controller to the at least one other co-located radio, the access grant indicating the at least one other co-located radio may engage in wireless communications; and
schedule transmissions of the transceiver based on the information exchanged with the at least one other co-located radio, the scheduling to avoid reception of the transmissions by the at least one other co-located radio, the scheduling including preventing all transmissions by the first transceiver during periods of signal reception by the other co-located radio.

10. The article of claim 9, further comprising instructions to schedule transmissions of the transceiver based on the information exchanged with the at least one other co-located radio.

11. An apparatus, comprising:
a first transceiver to communicate wirelessly across cellular links;
a second transceiver to communicate wirelessly across wireless data networking links; and
a coordination module to exchange information with the first and second transceivers, and to control wireless communications of the first and second transceivers based on the exchanged information, the exchanged information including a receive activity indicator sent from the first transceiver to the second transceiver, the receive activity indicator indicating that the first transceiver is engaged in an active cellular call, the exchanged information further including an access request sent from the second transceiver to the first transceiver, and an access grant sent from the first transceiver to the second transceiver, the access grant indicating the second transceiver may engage in wireless communications;

wherein the coordination module schedules transmissions of the first transceiver to avoid reception of the transmissions by the second transceiver, the scheduling including preventing all transmissions by the first transceiver during periods of signal reception by the second transceiver.

12. The apparatus of claim 2, the scheduling by the second controller including preventing all transmissions by the second transceiver during periods of signal reception by the first transceiver.

13. The method of claim 5, scheduling transmissions of the second transceiver including preventing all transmissions by the first transceiver during periods of signal reception by the second transceiver.

14. The article of claim 9, the computer-readable storage medium containing instructions that if executed enable a system to:

schedule transmissions of the other co-located radio based on the information exchanged with the transceiver, the scheduling to avoid reception of the transmissions by the transceiver, the scheduling including preventing all transmissions by the other co-located radio during periods of signal reception by the transceiver.

15. The apparatus of claim 11, the coordination module schedules transmissions of the second transceiver to avoid reception of the transmissions by the first transceiver, the scheduling including preventing all transmissions by the second transceiver during periods of signal reception by the first transceiver.

* * * * *